(12) United States Patent
Sherman

(10) Patent No.: US 6,389,507 B1
(45) Date of Patent: May 14, 2002

(54) MEMORY DEVICE SEARCH SYSTEM AND METHOD

(75) Inventor: David L. Sherman, Fremont, CA (US)

(73) Assignee: Gigabus, Inc., Fremont, CA (US)

(*) Notice: Subject to any disclaimer, the term of this patent is extended or adjusted under 35 U.S.C. 154(b) by 0 days.

(21) Appl. No.: 09/483,206

(22) Filed: Jan. 14, 2000

Related U.S. Application Data

(60) Provisional application No. 60/116,090, filed on Jan. 15, 1999.

(51) Int. Cl.[7] .............................................. G06F 12/00
(52) U.S. Cl. .......................................... 711/108; 707/6
(58) Field of Search .............................. 711/108; 707/6

(56) References Cited

U.S. PATENT DOCUMENTS

| 4,606,002 A | * | 8/1986 | Waisman et al. ............... 707/3 |
| 4,758,982 A | * | 7/1988 | Price ............................ 711/108 |
| 5,826,253 A | * | 10/1998 | Bredenberg ..................... 707/2 |

* cited by examiner

*Primary Examiner*—Reginald G. Bragdon
(74) *Attorney, Agent, or Firm*—Gray Cary Ware & Freidenrich, LLP

(57) ABSTRACT

A search system and method is provided that may implemented in a content addressable memory (CAM) using various different memory technologies including SRAMs. DRAMs or Embedded DRAMs. The search system increases the density and efficiency of the CAM by using a search tree to reduce the total number of entries that must be matched against the key.

9 Claims, 11 Drawing Sheets

Drawing of very wide 2 stage B-tree structure to find 1 of 16K bins

FIG. 3  Example 64 Mbit Binary/Ternary CAM

Drawing of specialty DIMM using invention

CAM portion Operated as Ram

Operation as Cam

Block diagram of a very wide 2 stage B-tree structure to find 1 of 16K bins: hardware to implement Diagram 2 tree structure FIG. 8 Basic data structures in the branches and bins (1M * 64 CAM)

FIG. 9 Bank & local compare & control block diagram

Details of final bin comparison logic
& mask option control

Per Bit Circuitry for Leaf Compare
Leaf compare is equality match,
not greater than as in tree.

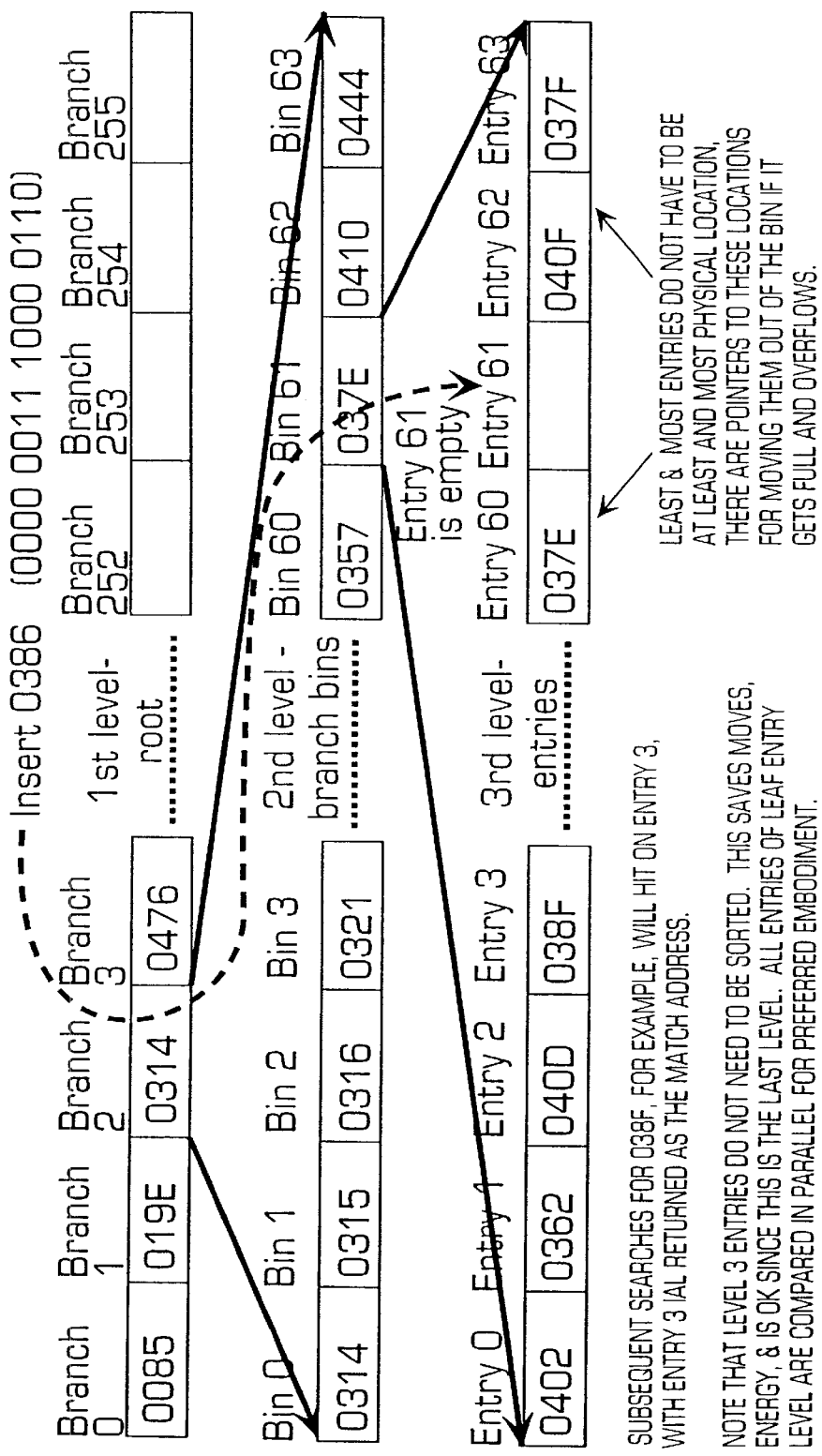
FIG. 11  New Entry Insertion Example for Binary Data

MEMORY DEVICE SEARCH SYSTEM AND METHOD

This Appln. claims benefit of Prov. No. 60/116,090 filed Jan. 15, 1999.

BACKGROUND OF THE INVENTION

This invention relates generally to a system and method for performing rapid searches in a memory and in particular to a searching method and system for a content addressable memory device that permits rapid searches to be performed for data contained in the memory.

A content addressable memory (CAM) device is a memory storage device that accelerates any application that requires fast searches of data stored in the memory. For example, searching a database, a list, or for a particular pattern in database machines, image or voice recognition or computer and communication networks may be particularly well suited to using a CAM. A CAM operates by simultaneously comparing the desired information provided by the user against a list of pre-stored entries. The CAM gives an order of magnitude reduction in search time as compared to a typical random access memory (RAM).

A RAM is an integrated circuit that temporarily stores data. The data is stored in various different storage locations (addresses) and the user may specify a particular memory location to retrieve a particular piece of data. In other words, the user supplies the address and receives that data back from the RAM. In contrast, a traditional CAM stores data in random memory locations wherein each memory location has logic associated with each bit which permits comparison to a datum being searched for, commonly called a "KEY". Each word of data also has a pair of status bits associated with it. The status bits keep track of whether the memory location has valid information or is empty and may be rewritten with new information.

Thus, the CAM stores a list of data in the memory locations. Once data is stored in the CAM, it is found by the user specifying a desired piece of data. The desired piece of data is fed into a compare register and is compared, to each bit in each memory word location simultaneously. If there is a match with a memory location, the address of that memory location, commonly called the "ASSOCIATION", is returned to the user. In other words, with a CAM, the user may supply a desired piece of data or pattern and the CAM may return an address or addresses if that pattern or piece of data was located in the CAM. Thus, the CAM may be used to rapidly compare the desired data to the list of data in the CAM since the comparisons are done in parallel. This feature makes the CAMs particularly suited at performing different searching operations. A CAM may be generated from any number of different typical memory device technologies including dynamic RAMs (DRAMs), static RAMs (SRAMs) or embedded DRAMs.

The key problems with typical CAMs is that compare logic, that performs the comparison of the desired data to each memory location in the CAM, must be located at every memory cell location which significantly increases the number of transistors that must be dedicated to the compare logic and correspondingly decreases the amount of storage the CAM (since fewer transistors may be used for storage) assuming a fixed number of transistors on an integrated circuit. (This ratio for traditional CAM to traditional SRAM may be calculated as at least a 3× ratio of area, due to the extra compare logic. And traditional SRAM has approximately a density ratio of 7×–10× to DRAM. This leads to a 21× to 30× advantage for DRAM compared to traditional CAM.) In addition, there is a large amount of power dissipation associated with every word having a dynamic match line that cycles during every compare operation. These problems severely limit the potential size of the CAM both in terms of the silicon area and not being able to economically package the die due to the heat generated.

Thus, it is desirable to provide a novel search system and method for memory devices that overcomes the limitations and problems with typical CAM and it is to this end that the present invention is directed.

SUMMARY OF THE INVENTION

A new tree search architecture in accordance with the invention is provided that is suitable for accelerating associative searches for data stored in any memory. In a preferred embodiment, the search architecture in accordance with the invention may be implemented as a new Content Addressable Memory (CAM) in accordance with the invention. The CAM in accordance with the invention may be produced using typical commodity dynamic random access memory (DRAM) technology process or using a static random access memory (SRAM) technology process for smaller, faster memory devices. In alternative embodiments of the device in accordance with the invention, a modified DRAM technology process with improved transistors in the branching logic for speed (typically known as Embedded Dram) may be used. Thus, the invention may be implemented using various different memory technologies including DRAM, SRAM or Embedded DRAM.

The search system and method in accordance with the invention permits a very large memory (suitably arranged as described below) to be addressed as a random access memory (RAM) and then data stored in the device may be searched using a content addressable memory (CAM) technique. This arrangement in accordance with the invention will permit at least a twenty times (20×) density (size) increase compared to other typical CAM memory organizations. The size/density increase in accordance with the invention greatly increases the utility of the memory device in accordance with the invention for a broad class of applications ranging from pattern recognition, data sorting & look-up and Internet traffic routing. When the memory device in accordance with the invention is used with suitable software, this architecture will greatly speed up Internet search engines and data base servers.

The combination of a novel search method and commodity RAM in accordance with the invention constitutes a new approach that permits the CAM to achieve a lower commodity cost similar to standard DRAM organizations by eliminating match logic completely in the memory cell. Thus, standard, typical well known RAM processing technology may be used for producing these memory devices in accordance with the invention. In accordance with another aspect of the invention, portions of the RAM arrays may be configured as RAM only so that the density available as RAM when using the device in accordance with the invention is doubled compared to it's use as a CAM, which makes the device used as a RAM more flexible.

In more detail, the search system and method in accordance with the invention may add additional pointers to a B$^+$-tree search algorithm/method so that the tree structure looks like a conventional CAM, but may be accessed by typical RAM addressing. When the method in accordance with the invention is implemented in an efficient hardware solution in a preferred embodiment, a commodity priced, DRAM-density CAM is produced. In more detail, the CAM in accordance with the invention may include a controller/comparator and two RAM memory blocks. The controller may organize the two RAM memory blocks and accesses them accordingly to achieve the desired CAM operation. The functions in accordance with the invention as described below may be implemented on a single silicon die or as several silicon die in a multi-chip package.

Thus, in accordance with the invention, a memory device is provided, comprising a main data memory for storing a plurality of entries in the memory device and an address map and overflow data memory for storing an address map of the entries in the main data memory wherein the address map comprising an intended address location (IAL) and an actual physical location (APL) wherein the IAL indicates the external memory address of each entry and the APL indicates that actual memory locations for each entry within the memory device. The memory device further comprises a controller for controlling the operation of the main data memory and the address map and overflow data memory using the IAL and APL in order to operate the memory as one or more of a CAM and a RAM and a comparator that compares each bit of an incoming piece of data with each bit of each entry in the memory device. The controller of the memory device further comprises search tree logic unit that sorts through the entries in the memory device to reduce the number of bit-by-bit comparisons performed by the comparator.

In accordance with another aspect of the invention, a memory device is provided wherein the memory device comprises a main data memory for storing a plurality of entries in the memory device and an address map and overflow data memory for storing an address map of the entries in the main data memory wherein the address map comprising an intended address location (IAL) and an actual physical location (APL) wherein the IAL indicates the external memory address of each entry and the APL indicates that actual memory locations for each entry within the memory device. The memory device further comprises a controller for controlling the operation of the main data memory and the address map and overflow data memory using the IAL and APL in order to store and retrieve data from the memory and a comparator that compares each bit of an incoming piece of data with each bit of each entry in the memory device. The memory device further comprises search tree logic unit that sorts through the entries in the memory device to reduce the number of bit-by-bit comparisons performed by the comparator.

In accordance with another aspect of the invention, a memory device is provided wherein the memory device comprises a main data memory for storing a plurality of entries in the memory device and an address map and overflow data memory for storing an address map of the entries in the main data memory wherein the address map comprises an intended address location (IAL) and an actual physical location (APL) wherein the IAL indicates the external memory address of each entry and the APL indicates that actual memory locations for each entry within the memory device. The memory device further comprises a controller for controlling the operation of the main data memory and the address map and overflow data memory using the IAL and APL in order to store and retrieve data from the memory, the controller further comprising an organizer that organizes the memory into a plurality of bins wherein each bin comprises a plurality of sub-bins and each sub-bin comprises a plurality of entries in the memory device wherein the bins and sub-bins having a least value and a most value associated with it that indicate a minimum value and a maximum value contained in the bin or sub-bin. The controller further comprises search tree logic unit that compares an incoming piece of data to the plurality of bins based on the least and most values to identify a bin in which the incoming piece of data is located and that compares the incoming piece of data to the sub-bins within the identified bin to determine the sub-bin that contains an entry matching the incoming piece of data.

BRIEF DESCRIPTION OF THE DRAWINGS

FIG. 11 is a diagram illustrating the insertion and search method in accordance with the invention.

DETAILED DESCRIPTION OF A PREFERRED EMBODIMENT

The invention is particularly applicable to a 64 Mbit content addressable memory (CAM) device that uses 128 Mb of DRAM and it is in this context that the invention will be described. It will be appreciated, however, that the system and method in accordance with the invention has greater utility, such as to other types of memory devices that may use other types of typical memory blocks such as SRAM or Embedded DRAM. In addition, the invention may be implemented on a single silicon die or as several die in a multi-chip package. It will be appreciated that this architecture achieves the same advantages over traditional CAM in subsequent memory density generations. Now, the preferred embodiment of the invention implemented as a CAM will be described.

Figure 1:
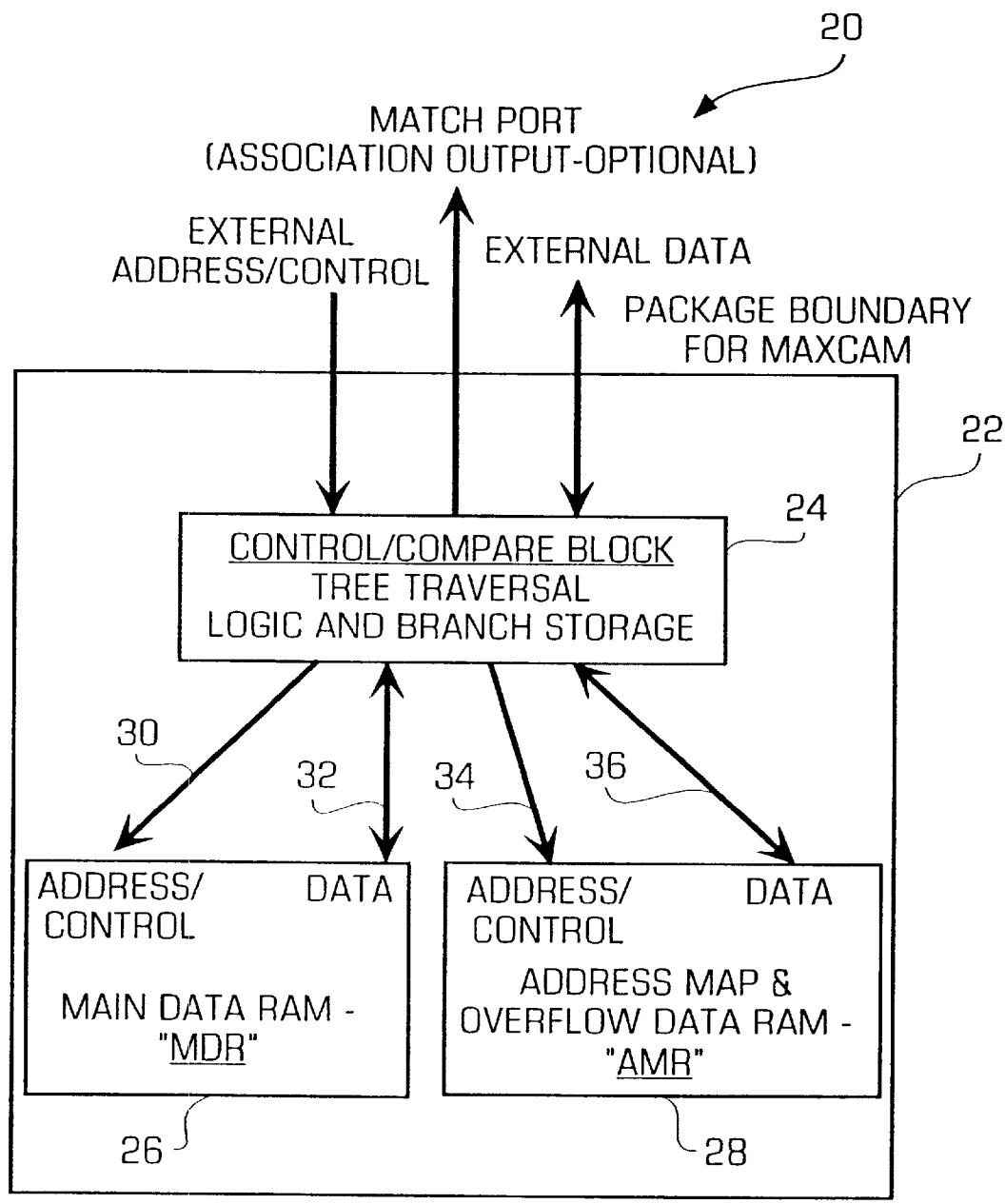
FIG. 1 is a block diagram illustrating a content addressable memory (CAM) in accordance with the invention.

FIG. 1 is a block diagram illustrating a preferred embodiment of a single die content addressable memory (CAM) 20 in accordance with the invention that implements the search architecture in accordance with the invention. The CAM 20 may include a semiconductor die 22 that interfaces to other external integrated circuits (ICs). The external ICs may, for example, supply an external address and control signals and other external data to the die 22 and may receive data from the die 22 that may include optional match port data indicating a match has occurred between a location in the CAM and the data in the compare register.

The semiconductor die 22 may include a control/compare block 24, a main data RAM (MDR) 26 and an address map and overflow data RAM (AMR) 28. The MDR and AMR are each separate typical RAM memory devices in this embodiment. The control/compare block 24, that is described below in more detail with reference to FIGS. 2–11, may control the operation of the CAM including storing data and performing the data comparison as described below. The control/compare block 24 may also include tree traversal logic in accordance with the invention that implements the searching method and system in accordance with the invention. The MDR 26 may contain the main memory store for the CAM, may be controlled by the control/compare block using an address/control bus 30, and may communicate data with the control/compare block and receive data over a data bus 32. Similarly, the AMR 28 may contain an address map of the contents of the CAM and overflow data RAM, may be controlled by the control/compare block using an address/control bus 34, and may communicate data with the control/compare block and receive data over a data bus 36.

In operation, the control/compare block 24 may organize the 2 RAM memories (MDR and AMR) and access them appropriately to achieve the desired CAM operation. As described above, these functions can be contained on a single silicon die or on several dies in a multi-chip package. In the preferred embodiment shown, the MDR 26 may hold 8 Mbytes of stored RAM/CAM data. The AMR 28 may contain both the intended address location (IAL) of the data stored at a corresponding physical location in the MDR and the actual physical location (APL) of the stored data for RAM-style read queries. In the preferred embodiment, the link structures for the data records of the AMR may look like:

AMR_Data[63 . . . 40, 39 . . . 20, 19 . . . 0]
    wherein bits 40–63 contain various flags and short links, APL data is stored in locations 20–39 and IAL data is stored in locations 0–19 as described in more detail in Table 1. The structure shown above is for a particular preferred embodiment with a particular implementation and the structure may be changed for different implementations without departing from the scope of the invention.

TABLE 1

Bit field meaning for AMR data for 1M*64 CAM

| Field Name | Bit position | Brief Description |
|---|---|---|
| IAL: "Intended Address Location" | [19:0] | This is the destination address indicated by the external address during a RAM write command to CAM area. This is returned as part (or all) of the association mapping during the CAM operation, once a data pattern match is completed. This field is stored in the AMR at the "same" (or simply mapped) address as the Data in the MDR. |
| APL: "Actual Physical Location" | [39:20] | During a RAM read to the CAM area, this is fetched first and used as the address for the MDR to fetch data. This implies that RAM reads are generally Random Accesses to MDR. This is generally true for database management tasks, until an actual table is being fetched. This field is stored at the address pointed to by |

TABLE 1-continued

Bit field meaning for AMR data for 1M*64 CAM

| Field Name | Bit position | Brief Description |
|---|---|---|
| LINKS/ flags: | 63:40 | the IAL, that is, the location where the data would have been stored in a regular RAM. This is dependent on implementation details. |

In accordance with the invention, the 2 DRAM blocks (MDR and AMR) may also be available as very fast ordinary RAM in which case the Controller/Comparer 24 may configure the CAM to allocate anywhere from 0–100% of the DRAM memory locations to the CAM and the remainder to the RAM operation. Even with the allocation of memory locations, the system still permits RAM-style accesses to the part being used (mapped) to the CAM operation. For the memory locations being used for strictly RAM operations typical full speed burst operations may be available. This allows the CAM to be used in DIMM sockets in servers that permits an easy upgrade path for use in list processing and data manipulation tasks in servers. Now, details of the search architecture and method in accordance with the invention will be described.

Figure 2:
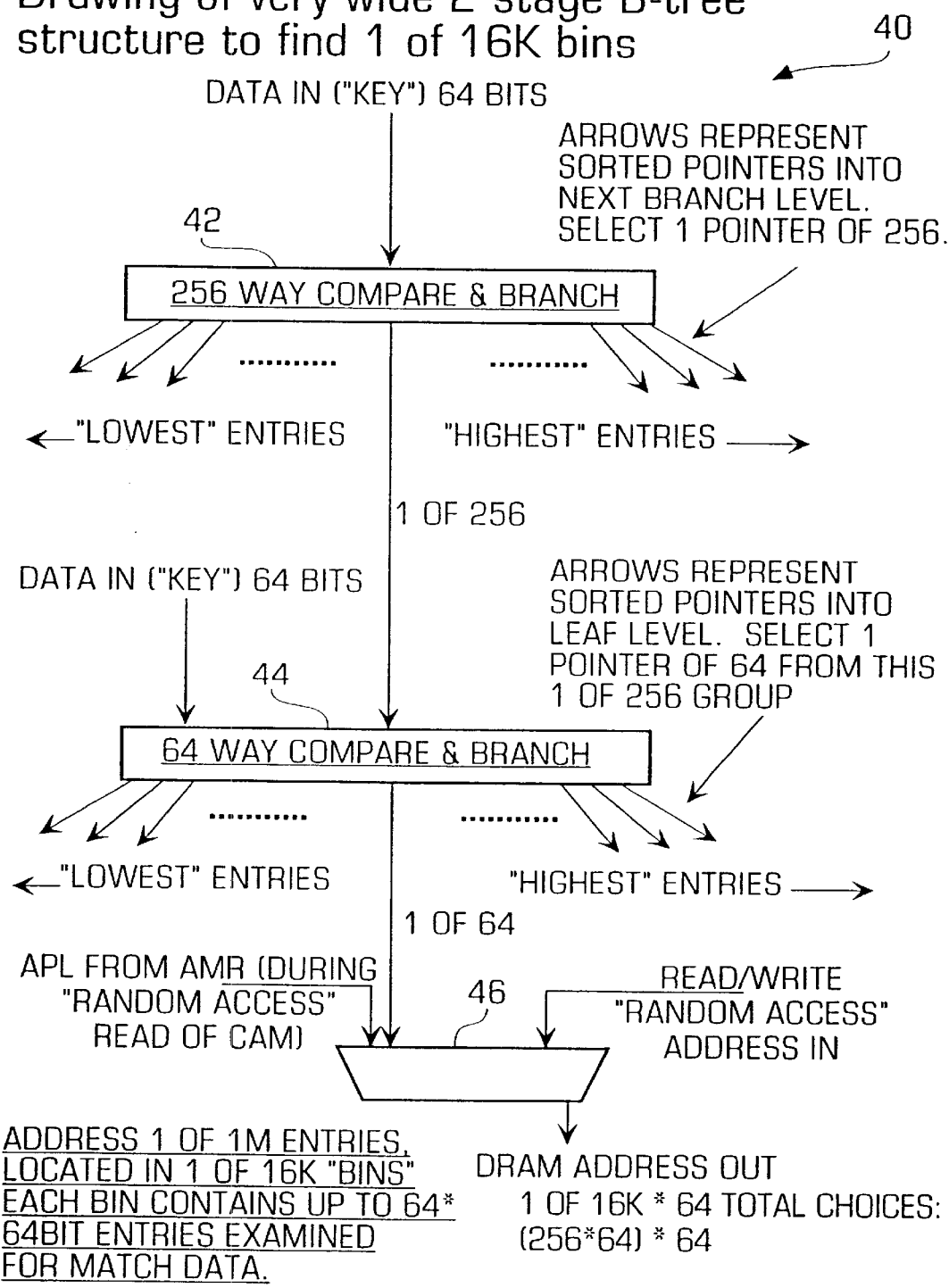
FIG. 2 is a diagram illustrating more details of the search architecture in accordance with the invention of the CAM in accordance with the invention.

FIG. 2 is a diagram illustrating the searching architecture 40 in accordance with the invention that permits a more rapid searching of the contents of the CAM in accordance with the invention. In accordance with the invention, a very wide search tree as described below may be used in order to converge on a data match in a tree structure rapidly. A very wide search tree is also more economical with branching between 64 and 1024 ways at each level, depending on the size of the ultimate DRAM that contains the leaves. In this preferred embodiment of a 1M*64 CAM architecture, there is a 2 level B-tree structure that finds an index into a final "bin" or "leaf" which contains 64 entries in a DRAM. The 64 entries may then be fetched by address (i.e., the index is retrieved from the b-tree structure) and compared against the key so that the comparison occurs with only the 64 entries instead of all of the entries which significantly reduces the comparison time of the CAM in accordance with the invention. In the architecture, note that there is no "CAM-cell" memory structure in the large memory blocks, only SRAM and DRAM memory cells.

Returning to FIG. 2, the architecture 40 may receive input data (a "key") that may be 64 bits in the example of the preferred embodiment. In accordance with the invention, the key may be fed into a 256 way compare and branch logic 42 that compares the key to each of 256 groups of the memory to generate a single pointer to the next branch level. The pointer generated by this logic 42 may be fed into a 64 way compare and branch logic 44 which also is fed the key. This logic 44 may again compare the key to each of 64 groups within the selected group from the original 256 to generate a single selected memory pointer to a block of memory. In this manner, the number of full memory locations that are compared to the entire key is rapidly reduced so that the final comparison of the full key to memory locations may be completed rapidly. The structure of the compare and branch logic 42, 44 is further illustrated in FIG. 7.

The output of the second compare and branch logic 44 (the address of a small group of memory in the CAM) is fed into multiplexer 46. The APL signal from the AMR (during random access reads to the CAM) and a read/write address (the memory address for non-CAM random access reads or writes) may also be input into the multiplexer so that the output of the multiplexer is the address of a bin so that the MDR may function like a CAM and return an address of a matching memory location or may function like a RAM. During CAM operation, the multiplexer may output the DRAM address for a matching entry (memory location) in the CAM from the tree. In more detail, the DRAM address may be 1 of over 1 million entries (256×64×64 in this example) wherein the entry is located in one of 16,384 different memory bins as selected by the two compare and branch logic circuits 42, 44 as shown in FIG. 2. The actual number of bins and entries varies with different embodiments and depends on the actual branches performed by each circuit 42,44. In this example, each bin (selected by the two logic circuits 42, 44) may contain up to 64 64-bit entries that may be examined for a match. Thus, in this preferred embodiment, instead of matching the key against over a million entries, the key may be matched against 64 entries which significantly reduces the time required to perform the comparison compared to the time required for a sequential search of the DRAM and significantly reduces the circuitry required to perform the match compared to the circuitry required in a traditional CAM (by a factor of a constant multiple of 16384 in this instance or, in general by a factor which is a constant multiple of the total memory/ branch bin size ).

Figure 3:
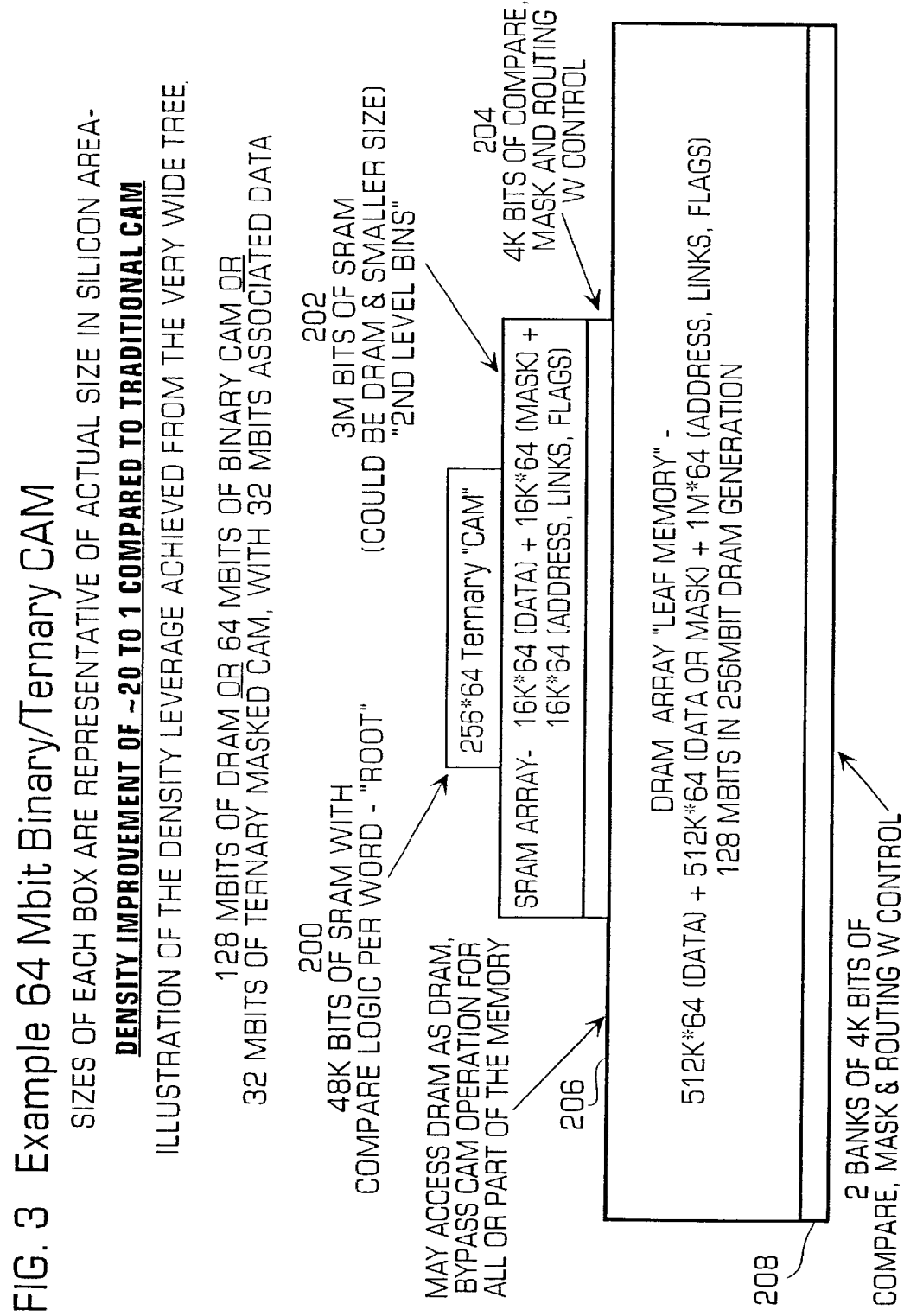
FIG. 3 illustrates the silicon area advantage of the very wide tree lookup in accordance with the invention.

The advantages of the wide tree structure are three fold. First, the ratio of storage in the tree is very low (in terms of number of bits) in relationship to the final data storage since the comparisons at each level can be performed in parallel across 4–64 K bits of comparator logic for speed. This is illustrated by FIG. 3, which shows the leverage obtained by viewing the relative area of the tree silicon resources. In particular, FIG. 3 illustrates that the memory device in accordance with the invention may be used 128 Mbits of DRAM, 64 Mbits of binary CAM or 32 Mbits of ternary CAM with 32 Mbits of associated data. In addition, the generated heat per bit examined is reduced as compared to the toggling of the match line for every word in a comparable size traditional CAM. This makes it possible to achieve a CAM with state of the art DRAM density at a small multiple of the cost of commodity DRAMs.

An example of a 64 Mbits binary/ternary CAM is shown. The CAM may include various elements that will be briefly described. The sizes of the boxes shown in FIG. 3 represent the actual size of the respective elements in silicon area when incorporated into a memory device. The CAM may include a root element 200 that may be 48 Kbits of SRAM with compare logic per word. The CAM may also include an SRAM array 202 with 3 Mbits of SRAM (it could also be DRAM and have a smaller size) that contains the $2^{nd}$ level memory bins in accordance with the invention. The CAM may also include compare logic 204 with 4 Kbits of compare, mask and routing logic. The CAM may also include leaf memory 206 that may be a DRAM array with 128 Mbits of DRAM. Finally, the CAM may include a second logic layer 208 that may include 4 Kbits of compare, mask and routing logic.

This may result in a specialty DIMM module that may be configured as SD-100 DRAM or alternatively, a portion or all of the memory could be configured as CAM which would be about ½ the density as when configured as a DRAM only. These DIMMs could be used by a CPU to speed up associative searches and sorting, but still be useful when configured as ordinary DRAM. In addition, the portion configured as CAM memory could still be conveniently accessed as RAM. A vast array of data base tasks could be sped up, effectively multiplying the value of a server containing the special DIMMs.

Figure 4:
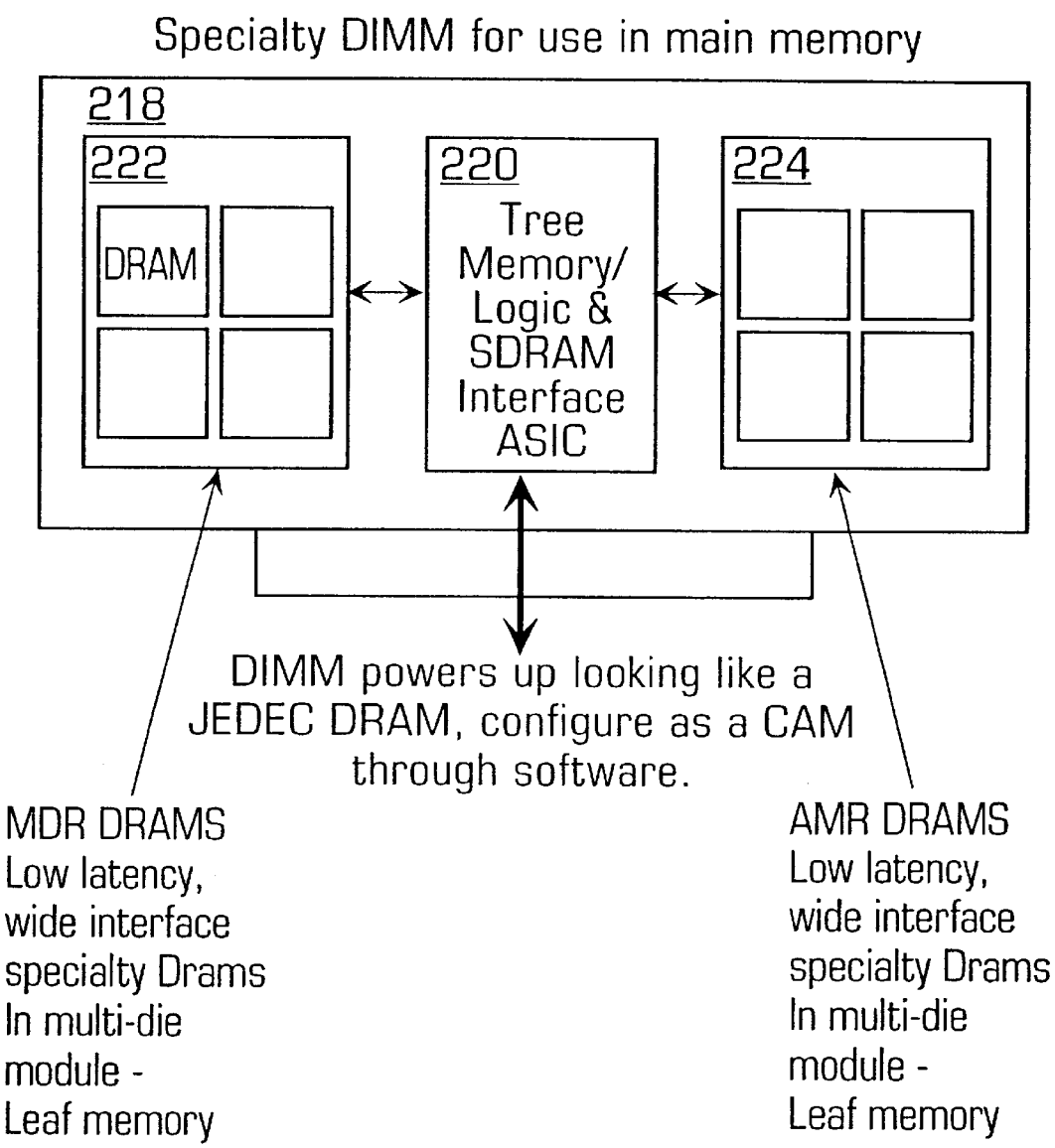
FIG. 4 shows a block diagram of a DIMM memory architecture in accordance with the invention.

A physical block diagram of the arrangement of the DIMM 218 in accordance with the invention is shown in FIG. 4. The diagram shows a separate ASIC 220 that performs the interface to the memory bus, and also contains the tree logic from FIGS. 2 and 7. MDR DRAMs 222 and AMR DRAMs 224 are shown as separate DRAMS, which may be either standard DRAMS, in a slower version, or specially designed DRAMS that optimize the tree search. Preferably, the MDR and AMR may be low latency, wide interface specialty DRAMs in the multi-die module and may each contain the leaf nodes of the search tree. The DIMM may power up looking like a typical JDEC DRAM and then be configured as a CAM through software. Now, the operation of the memory device as RAM using the APL address and as CAM using the IAL address will be described in more detail.

Figure 5:
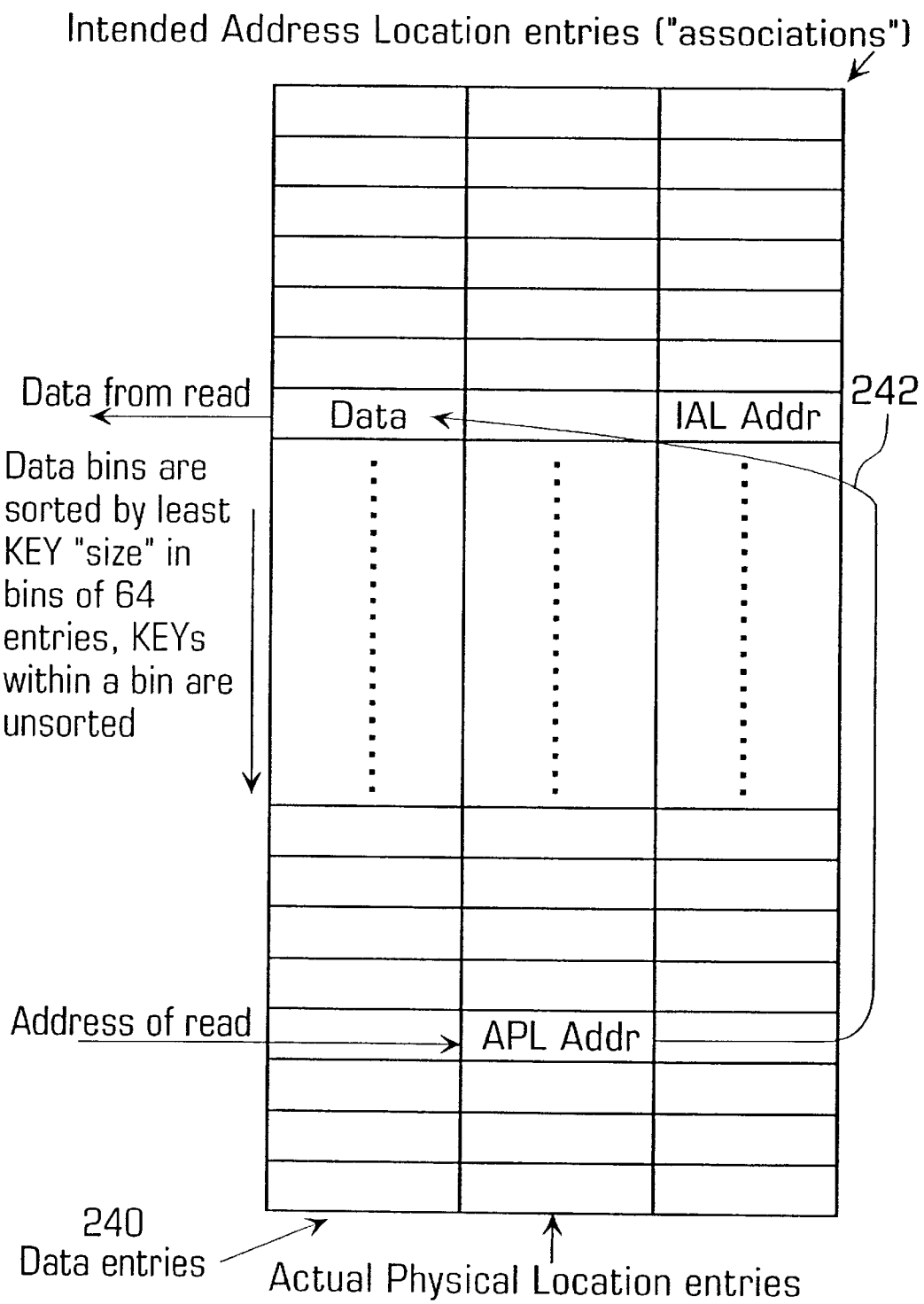
FIG. 5 is a more detailed illustration of the use of the APL when the memory device in accordance with the invention is used in the RAM mode.
Figure 6:
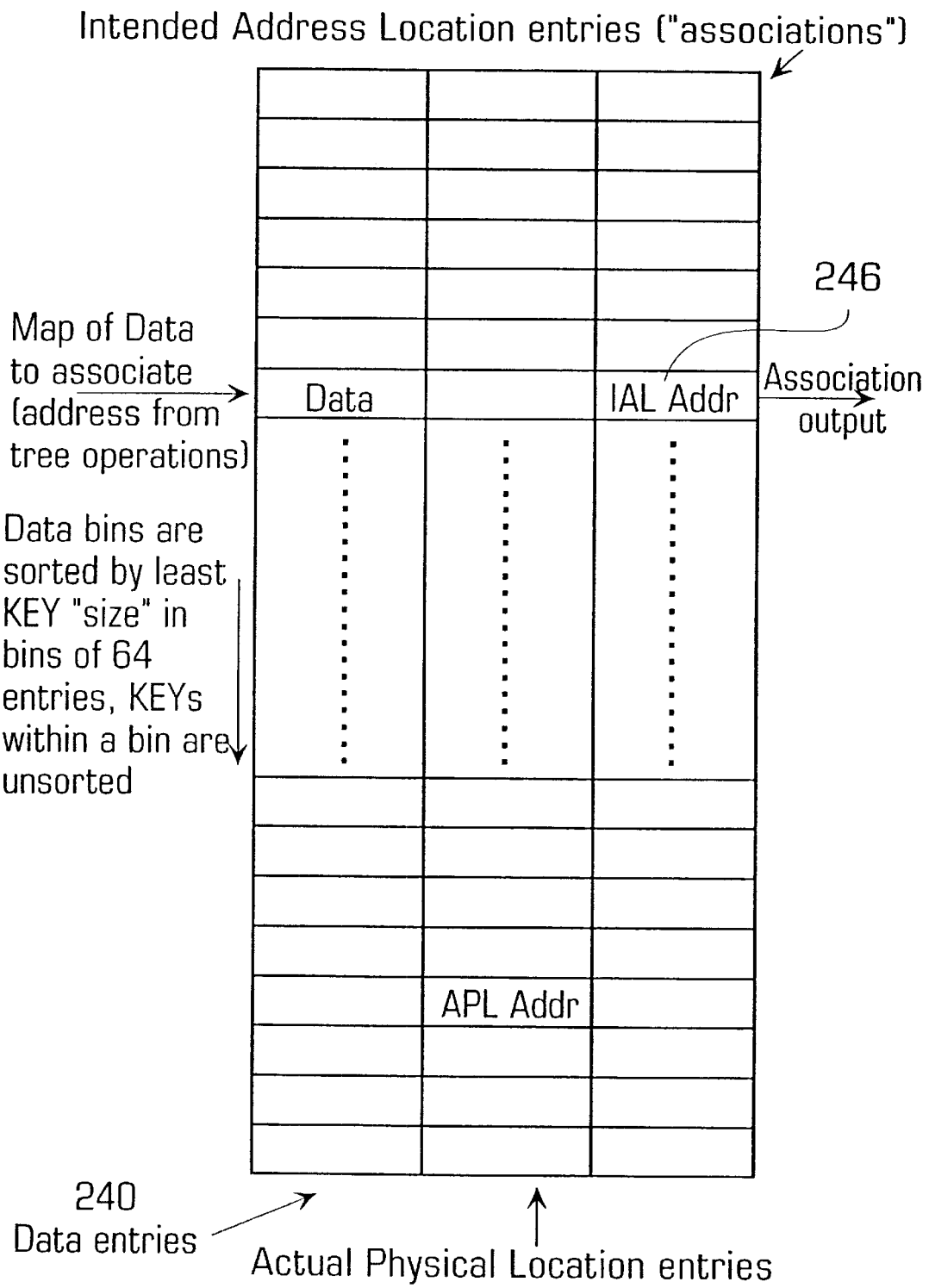
FIG. 6 is a more detailed illustration of the use of the IAL when the memory device in accordance with the invention is used in the CAM mode.

Referring to FIG. 5, during operation as a RAM, each leaf entry 240 may also contain a pointer 242 to where the data that would have been stored in an ordinary RAM actually was stored in during the sorting process (the APL as described above). Similarly, referring to FIG. 6, during operation as a CAM, each entry in the leaves of the tree 240 may have associated with it an address 246 where the program "thought" it was storing the data (the "association address" or "mapping address") when it wrote the data into the CAM area (the IAL described above performs this function). When reading the CAM area as a RAM, the input address will fetch this APL pointer to find the "RAM" data. That is, as data is written into the CAM area, it is sorted into bins with data which is "close" in magnitude as described below, and a pointer to the actual physical location of the key data is stored at the physical address that will be pointed to when attempting to retrieve data as a RAM. In many versions of the invention, the APL portion of the AMR will be able to be accessed separately in time (i.e. in a pipeline) from the access of the data portion (in the MDR) & IAL portion of the AMR. This will prevent accesses to the APL from blocking accesses to the MDR. FIGS. 5 and 6 therefore show the logical grouping of the entries as a memory entry, but physically they are likely to be separate physical blocks.

Returning to FIG. 2, each branch in the tree has an associated Key value that defines the least bounding value for the subsequent branches or leaves underneath that branch and the address pointer to the next node in the tree, or the final leaf or "bin" of data. The method for inserting the entries into the tree may attempt to keep the number of branches at each level to less than ½ the maximum until all subsequent levels in the tree are similarly filled to at least ½ capacity. This insertion method should leave plenty of room to insert data into each bin without excessive collisions until the memory is more than 63/64ths full (i.e., 64 =the # of elements in a bin.). A description of the corner case where the memory is "almost full" is provided below in connection with an insertion and smoothing method in accordance with the invention.

In operation, since SRAM access speeds of much less than 10 nS are now possible, each branch in the 2 level tree shown in FIG. 2 may be traversed in on the order of 10–15 nS. With state-of-the-art DRAM storage and a single die implementation, the 64 entries per bin (in the embodiment shown in FIG. 2) should be accessible in 20 nS as a 64*64 or 4 Kbit entity. This speed implies that pipelined operation of the branches and lookup for DRAM versions should run at 50 Mhz (faster if different banks are accessed), or over 20 MHz in a non-pipelined mode. Now, the hardware that may be used to implement the search tree architecture shown in FIG. 2 will be described in more detail.

Figure 7:
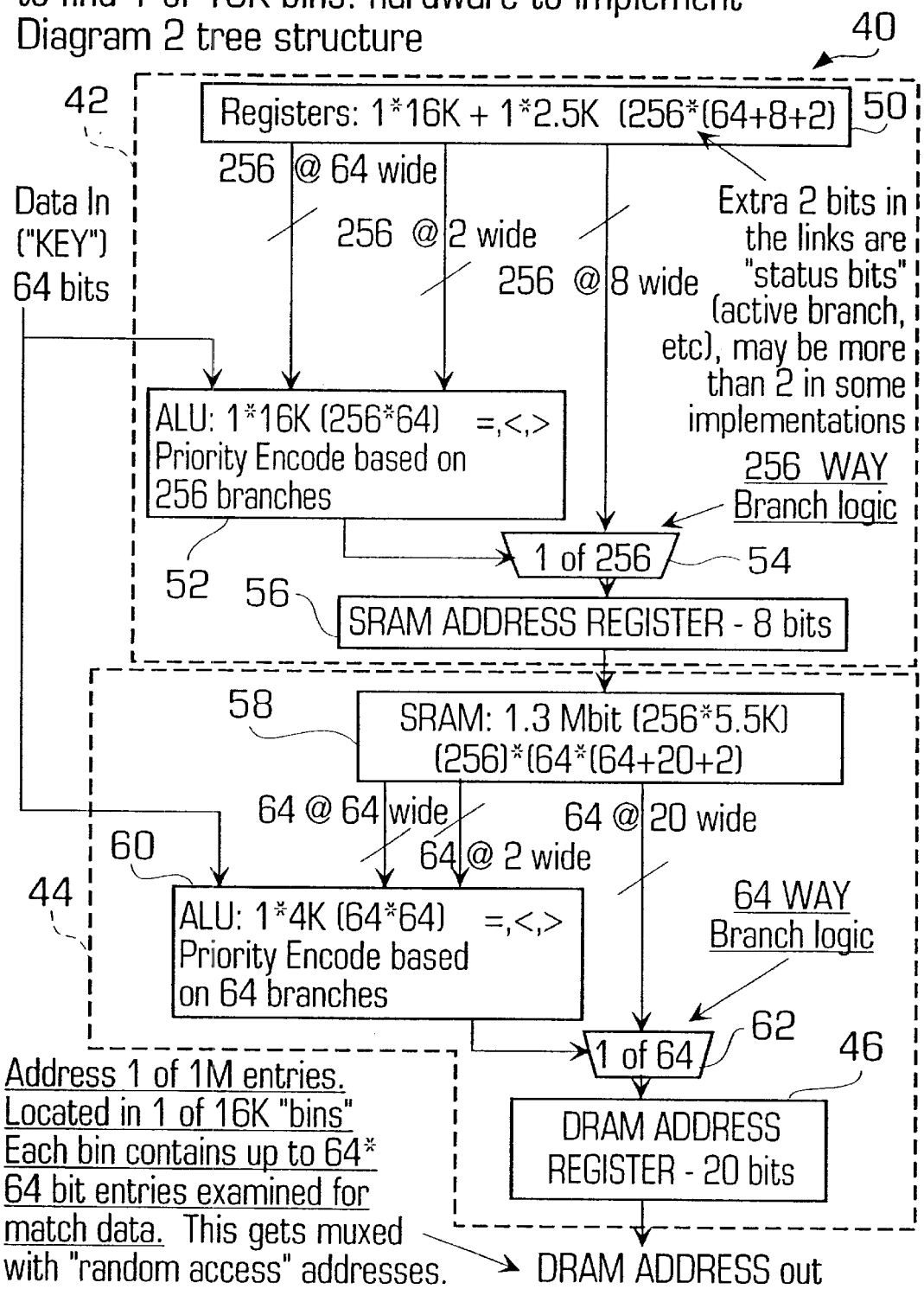
FIG. 7 is a diagram illustrating more details of the search architecture in accordance with the invention of the CAM in accordance with the invention.

FIG. 7 is a diagram illustrating a preferred hardware implementation of the search architecture 40 that includes the first branch logic 42, the second branch logic 44 and the comparator/DRAM address register 46. In more detail, the search architecture may include a set of registers 50 that store the AMR data and thus include two extra bits in the links that are the status bits indicating an active branch or not. This register memory, combined with ALU 52 may be organized as a small special CAM, with SRAM cells for memory instead of registers.

A comparison of the 64-bit key and the branch data from the register 50 is performed in 52. Each branch value from 50 is compared for greater than or equal to the key. The results of the comparison are priority encoded based on the possible 256 branches at this level of the tree (with larger branch number having higher priority). The status bits suppress inactive branches from participating in the comparison. The output of the ALU may be fed into a multiplexer 54 that selects the 8 bits pointer corresponding to the highest branch that compared greater than or =. The output of the multiplexer is a selection of one of the 256 bins at this level and its associated address. The output of the multiplexer may be stored in a SRAM address register 56 that may be 8-bits in size in this embodiment. The address stored in the register may be used to retrieve data from an SRAM 58.

The output from the SRAM may then be fed into the second branch logic 44 along with the key. The branch logic 44 may further include an ALU 60 that performs priority encoding based on the 64 branches at this level and outputs the resulting data. The resulting priority encoded data and the data from the SRAM may be then fed into a multiplexer 62. The output of the multiplexer 62 is the address of the least entry of a 64 entry bin and the address may be stored in the DRAM address register 46 so that the DRAM address may be output.

The above embodiment is merely an example of a device that may be implemented in accordance with the invention. For example, the "N" in each N-way branching logic is clearly flexible and can be tailored to fit the needs of the target DRAM memory and the ultimate size of the DRAM array. Thus, some implementations might make the branching number lower or higher than indicated here.

In some embodiments, the multiplexers & associated SRAM bits (8 & 20 respectively) will be replaced with simpler and smaller logic that simply encodes the output of the priority encoder into an 8 or 20 bit (16 bits plus 4 trailing 0 bits to define a bin) value, eliminating a level of indirection. This may be acceptable in many cases, and will have superior area efficiency.

In the embodiment shown above, a "Nearest search" closeness based on 2-s compliment size is clearly very robust in this scheme. Once a key has found the best candidate bin, if an exact match was not present, the entries in that bin could be examined to find which was closest. This could either be accomplished by examining all entries in parallel, or in the case where the entries in a bin have links (6 bits in this case of a 64 entry bin) which indicate the ordering of the entries, performing a binary partition search to find between which 2 entries the key falls.

In accordance with the invention, it is possible to arrange the CAM circuitry in accordance with the invention to perform 128 bits CAM operations, or any other desired size, by additional pipeline stages in the ALU operation or by running the branch stages at a slower rate if that is required. This may also be configurable based on a status bit. In accordance with the invention, the efficiency of this search architecture improves as the data match (key) gets bigger since the overhead of the AMR becomes a smaller percentage of the total memory space. In addition, by using the association address (the address where data is stored- the IML) as a further pointer to data stored in the portion configured as conventional DRAM, the efficiency of the architecture is improved even further.

The memory in the branches will be DRAM in many embodiments or the final "look up (leaves) bins" could conceivably also be SRAM. This disclosure is anticipated to be the preferred way. Also, the detailed memory architecture below is not required for the basic algorithm to work, albeit with less speed or energy efficiency.

The invention may be used for a variety of applications where the speed increases due to the search system and method is particularly beneficial. For example, the invention may be used for image processing, pattern recognition, data base mining applications, artificial learning, image recognition (satellites, etc), IP address routing and lookup, and routing statistics for networking applications and voice recognition both in mobile/desktop computers. In addition, DIMMs in accordance with the invention as described above may be used in server farms and central office for international language translation uses and URL matching. Further, the invention may be used for disk/database caching, multimedia applications(e.g., compression algorithms) and scientific simulations.

Figure 8:
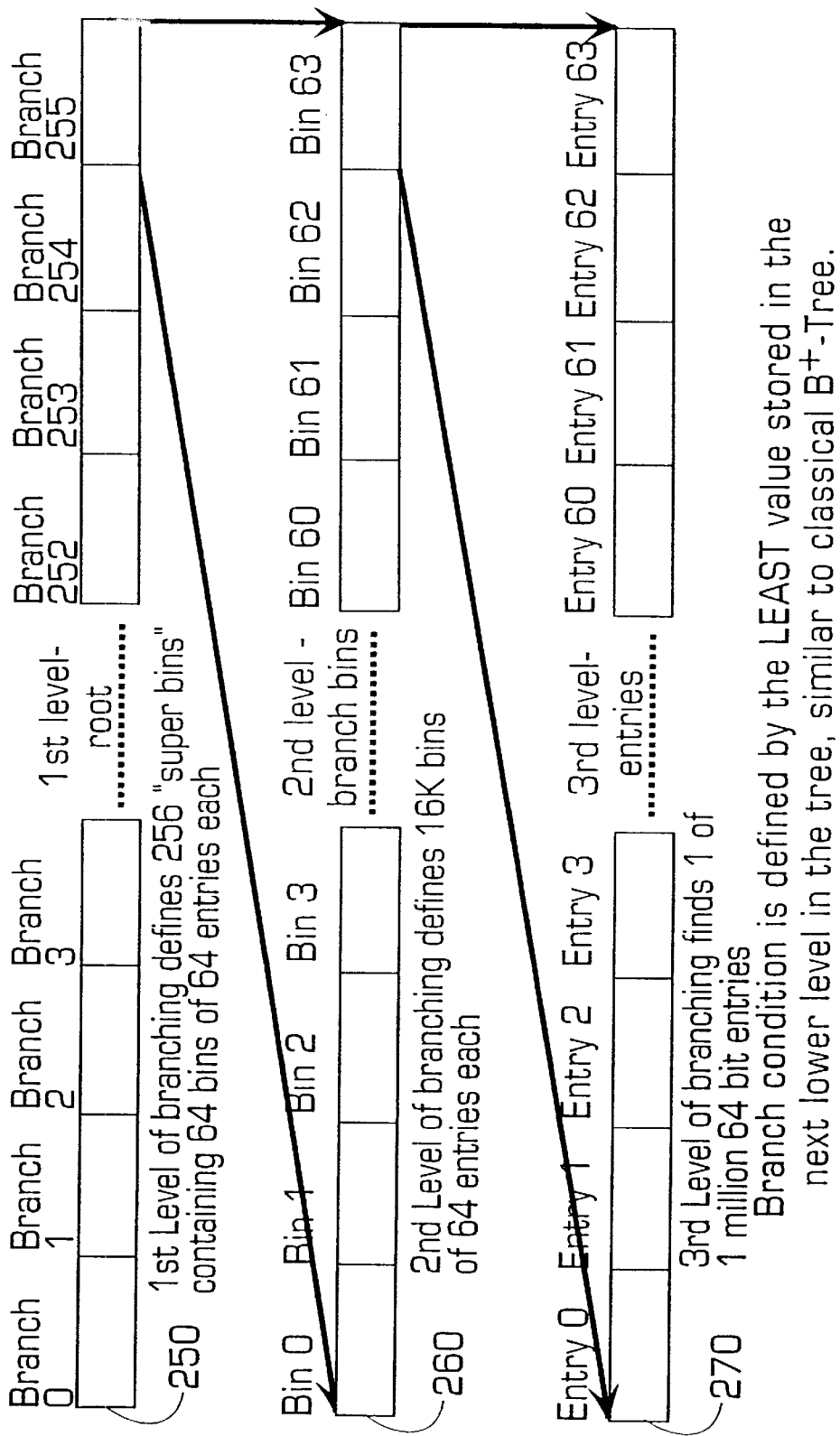
FIG. 8 is an alternate view of the TREE branching data structure in accordance with the invention.

FIG. 8 is a diagram illustrating an example of the basic data structures in the branches and bins of the memory device in accordance with the invention. The diagram illustrates a first level of bins 250, a second level of bins 260 and a third level of bins 270. As described above, the first level of bins defines 256 super bins which each contain 64 bins themselves of 64 entries each. The second level of bins 260 may be selected by a first level of bins and each second level bin may contain 16 K bins of 64 entries each. The second level of bins 260 each point to a set of 64 entries that may then be compared to the key as described above. Thus, using the search tree in accordance with the invention, the memory device rapidly searches through 1 million 64 bit entries. Now, the control for each bin in the CAM in accordance with the invention will be described in more detail.

Figure 9:
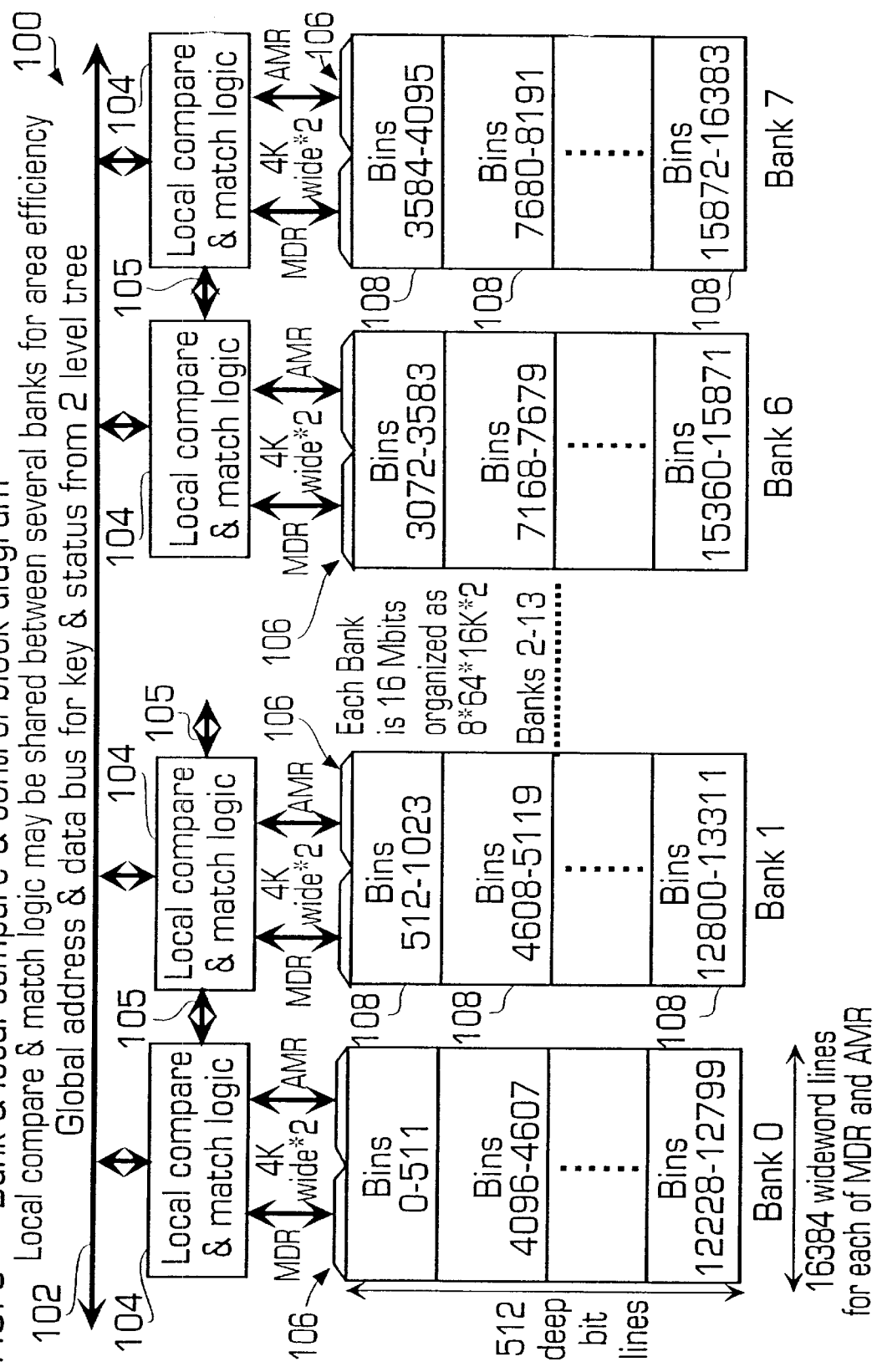
FIG. 9 is a diagram illustrating more details of the compare and control logic at each bin of the device in accordance with the invention.

FIG. 9 is a diagram illustrating the control and compare logic 100 for the memory banks in accordance with the invention. The control and compare logic 100 may include global address and data bus 102 that provides communication between the search architecture and the local control and compare logic, a local compare and match logic 104 for each bank of memory and one or more banks of memory 106 that each contain one or more bins of memory 108. As shown, the multiple local match and compare logic may be interconnected together by a bus 105 and in fact a single match and compare logic may be shared by one or more banks of memory for better layout efficient on the semiconductor die, or each bank has its own local match and compare logic which may have an MDR signal and an AMR signal that are connected to the memory bank controlled by that local match and compare logic. In the embodiment shown in FIG. 9, the MRD and AMR signals may be 4096 bits wide, each bank may be 16 Mbits with seven banks and the total number of 64 entry bins may be 16383.

In operation, the final bins of data in the DRAM may be stored in order of receipt, i.e. unsorted for size. Then, the final comparison/prioritizing operation may find the closest (or exact) match by comparing all 64 entries in a bin in parallel as shown in FIG. 9. This conserves most of the power and time to move data items into a sorted order in the DRAM. When the bins get full and the most or least entry needs to be moved to the next bin over, extra sorting processing and energy must be used. It is important to note that FIG. 9 is not a semiconductor floor plan, but a logic organization diagram for purposes of illustration and there may be many floor plans or organizations that are encompassed by the invention. Further, for a particular implementation, the actual bitline and wordline lengths will be dictated by feasible multiplexing and sensing ratios in a particular DRAM technology generation.

Returning to the example shown in FIG. 9, the memory may be organized into two 64 Mbit blocks of eight 8 Mbit banks each. Each bank may include a very wide organization of (512 deep) bitlines, 16 k wide wordlines (rows) multiplexed to produce 4 k data out, giving a "column" address of 2 bits to differentiate the bin within a row of 4 bins. One block may be for the MDR and one for the AMR. In the example shown, these blocks are physically organized such that bank* of MDR is next to bank* of the AMR. The mapping of the 4 bin rows into the banks is flexible because the pointer from the level 2 branching can reach any 64 bit memory location to define the bin in question. Now, several different bin mapping techniques will be discussed.

One technique to map the memory bins is that the next row in a bank contains bins 4 away from the current ones. Thus, the same row in separate banks represents bins 4* bitline depth or 1 K away. This lets the "bins" on "either side" of the bin addressed from the B-tree be accessed for quick splitting of leaves in the tree. This mapping minimizes the energy used to "smooth" bin utilization out so that bins always have storage available for quick insertion and also maximizes the chance that smoothing can run as a background task. (In other words, a bank that is not being accessed can easily move data to neighboring bins as a background task to equalize the entries in each bin, without requiring use of a global bus to move data around except for connecting the ends of banks to each other.

As an alternative mapping technique, an organization that would have contiguous groups of 4 bins may be located in neighboring banks. This would allow the "least" and/or "most" entry in a bin to be reallocated to the neighboring bins without an additional memory cycle since the neighbor could be opened simultaneously since it would be in a separate bank. Neighboring banks may also share a local bus connection to facilitate this transfer that would not require and use the global bus resources, keeping energy dissipation down.

Another alternative mapping technique is to map the bins in a coarse "checker board" within each bank with gaps in each bank where the next bins are in a neighboring bank. This technique is shown in FIG. 9. With that checkerboard organization, the CAM will be able to quickly "open up" large bin areas for totally new data patterns that don't fit within the existing range of data branch values that are sorted. In other words, one "square" of the checker board could be used as a smaller version of the CAM so that any systematic time variation in the data patterns won't "saturate" the comparison values for the entire CAM into a small region of the possible 64 bit values. Since the gaps are coarse, the energy/time to "connect" neighboring bins in different banks at the "borders of the checker board" is not dramatically increased. The most flexible search architecture in accordance with the invention may have several tree to bin "mapping" algorithms resident for the user to choose based on expected usage, with the best "all around" algorithm as a default.

In accordance with the invention, it should be noted that bulk "moves" of bins containing N data items implies touching up to N APL links in the AMR since the data will have moved even though it is in the same "location" (IML) to the outside user. When a CAM area is being used simply to do sorting or merging of 2 files, the APL can be turned off for faster reorganization of bins. That is, the CAM areas can be only content addressable after written for some uses. Now, more details of the local compare and control logic will be described.

Figure 10:
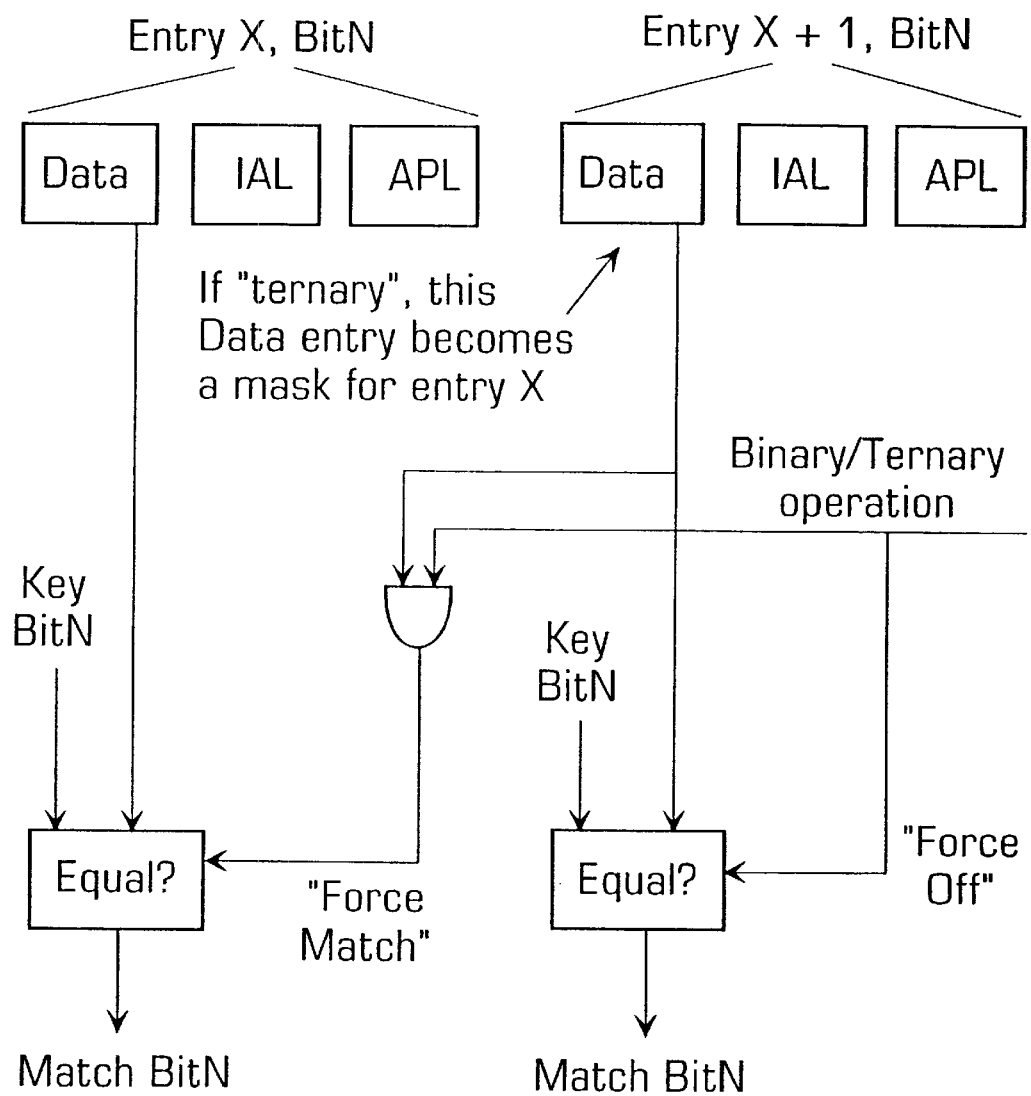
FIG. 10 is a diagram illustrating the flexible multiplexing that allows use of the memory device in accordance with the invention as a BINARY CAM or a TERNARY (MASKED) CAM.

FIG. 10 is a diagram illustrating more details of the compare portion of the logic 104 of FIG. 9, and illustrating the advantages this invention attains in flexible usage of the memory array compared to traditional CAM. A single bit of 2 entries in a bin are shown. Unlike the tree comparisons, the leaf comparison is a simple equality to find a match, since no further reduction of the search space is required. Also shown is circuitry to turn Entry X+1 into a mask for data entry X. If the Binary/Ternary signal is set to "binary", the AND gate is turned off, and both entry X & entry X+1 participate in comparison against the key. If Binary/Ternary signal is set to "ternary", the and gate is turned on, and a 1 bit in Data Entry X+1 forces a true comparison. This means the Data Entry X+1 is acting as a comparison mask for data entry X. During this operation, the comparison for entry X+1 is suppressed. Note that the IML & APL for the X+1 entry become free to be part of the returned association as well.

This comparison circuitry represents a small percentage of the total transistors in the invention, since the comparison logic per bit is shared by all memory bits in a bitline of the memory, unlike a traditional CAM, in which this circuitry would be replicated at every bit. In comparison, it can readily be appreciated by one skilled in the art, that adding the binary/ternary control & gating at every bit of a memory to achieve the ability to program a block to perform either binary or ternary compare operations would be an uneconomically large burden for the traditional CAM. In a traditional CAM capable of ternary comparisons, binary comparison is achieved by programming the mask Off, wasting that storage for other uses. The invention allows that storage to be economically recovered for use as Data in a binary compare operation. So, as a unique advantage of this architecture, it is possible to program all or portions of the CAM to perform binary OR ternary comparisons, with the binary areas being twice as large in number of data bits as the ternary memory areas. Now, the insertion method in accordance with the invention for inserting entries into the CAM will be described.

There are many candidate insertion algorithms ranging from greedy algorithms that use new bins whenever neighboring bins are ½ full to algorithms that reserve 1 of every 4 bins to accommodate data "clustering" that changes in time and may burst many closely related new values that aren't "close" to previous data. As an example, IP addresses for the Internet may exhibit this behavior. However, any insertion algorithm needs to be robust for the corner case when the CAM configured area is operated with many bins full and there are only 1 or 2 openings left in remaining bins. While many uses for CAM require only "slow" insertion rates, excessive "re-arranging" of data can still lead to unacceptable collisions with accesses during the matching operations. In addition, the energy inefficiency of a write (insertion) operation rises dramatically.

Using the organization shown above in the figures, insertion rates should stay very high until each insertion is trying to overfill a bin with neighbors several n*4 away already full (e.g, for the case where the memory is more than 63/64 full if the smoothing algorithm has successfully kept the distribution even.) In the case that the CAM is so close to full that smoothing would take excessive time, the CAM may preferably use the storage in the AMR to store one or more overflow entries for that bin. In the example shown in FIGS. 1 and 2, if 2 bits per AMR entry are reserved for this, then there is enough storage for an overflow entry per bin (2*64.).

All of the preceding discussion about mapping are aimed at optimally avoiding the case where the entry forces all bins between the target bin and a bin with an available location to re-organize their least & most entry pointers. If that occurs at the same time that a new entry write attempt to the same bin occurs, that will cause a stall of the insertion process. This stall situation can not be avoided by any insertion algorithm if the CAM area is run continually in an "almost full" state. However, the "fullness" that causes the increase in the insertion times occurs at a much higher level than software hashing algorithms in the literature due to the ability to use the local compare and match logic for each bank to "invisibly" move entries transparently to the match & insertion process. It is important to note that this problem may be avoided since the user of the CAM may simply not operate the CAM area in an "almost full" state, or if that is unacceptable, sufficient "invisible memory" can be added to allow "buffer bins" to be mapped in to handle overflow situations. This mapping is the intended use of the indirection in the tree. Instead of moving entries out of a bin in bulk, with the required updates of APL pointers, a new bin can be selected by the 20 bit $2^{nd}$ level SRAM pointer, and a bin of memory that has been held in reserve can be mapped "in between" existing bins in an area of the tree that is congested. This is a unique advantage of the invention, since table management in traditional cams, especially ternary cams that use the cam address as a match priority, can be very onerous. The invention allows easy and flexible allocation of leaf bins according to need.

The invention allows for an extension to find set intersection of sets. If a datum belongs to several larger databases, the same data (masked or not) may be stored in several different addresses (i.e., with several different associations), however all the entries will be grouped together in the same or contiguous bins. Then, when a CAM operation (data search) takes place, all of the different data bases that contain that datum can be identified quickly, as they will all return match. This feature is a very important feature which can implement set intersection calculations for data bases that are resident in the CAM. For example, say that the data base for "U.S. cities" and the data base for "animals" are both resident in the CAM. When the data record "buffalo" is presented to the CAM, it will return the address (association) for both the U.S. city and the animal. Traditional CAM can also identify all the data items that match a key, and return them all, but traditional CAM is to small to hold entire databases, and the time to page in and out of the CAM overwhelm the advantage of the fast comparison once data is in the CAM. The invention is LARGE enough so that multiple instances can hold a database and avoid the time to swap the databases in and out. Further, traditional CAMs do not allow "almost the same" set comparisons which can be performed by the invention (due to grouping of like entries), thus the invention allows "fuzzy" set intersection on a very large memory.

In addition, the CAM architecture may also perform functions like merging and sorting lists just by writing data into the memory. This is very powerful again since it occurs in a large enough memory to be meaningful for data base tasks. Sorting is a natural feature of the invention, and traditional CAMs CAN NOT sort data, since they only perform equality comparison and return yes/no match answers. After a database was entered into the invention, the memory could be scanned out in bin order, and the database would automatically be sorted. So this constitutes another unique advantage of the invention.

A smoothing method may be used to move around the entries in the CAM so that each bin is approximately equally filled which reduces collisions. There are many possible smoothing methods that may be used. A preferred method involves having the local compare and match circuit for each bank move items out of "too full" bins (as defined by a user defined variable) and into neighboring bins until the bins are filled to within some delta variable (again as defined by the user). This smoothing may be done as a background task as banks are sitting idle. By allowing the local compare and match to move more than one item at a time from bin to bin, the smoothing method is able to keep ahead of the insertion algorithm for all except the most extreme cases of an almost full memory (as discussed above). Any smoothing method implies moving data that is already stored and therefore, extra energy dissipation. Disabling the movement of data until required to "split a leaf bin" (or move the extra items from full bins that are stored to) will minimize the energy consumption of the memory. Now, a method for identifying the entries in a bin with the least value and the most value will now be described.

In order to achieve the above system, it is desirable to provide an efficient method for determining the entries with the least value and the most value in each bin so that these values may be used by the search tree during the tree search. In a preferred embodiment, either a 6-bit field can be reserved in the AMR entry to identify the ordering of elements (and hence the least value and the most value) or the information may be regenerated with each access to a bin. The determining method is implementation dependent based on possible sharing of the local compare and match circuitry amongst banks.

In accordance with the invention, it is also possible to combine one or more CAM in accordance with the invention together to produce a larger capacity CAM. In particular, there are many well known ways to assert a signal common to several parts (e.g., open collector, or simply ORing and then polling for which is asserted). In accordance with the invention, the CAMs may either be treated as a common pool of memory with each part creating it's own local tree, or a special ASIC could treat each part as a branch in a still larger tree that it creates.

FIG. 11 shows an example each of insertion & search. The insertion selects the largest branch which the new entry is larger than or equal to, and gets written to any empty entry location. In FIG. 11, 0386 is larger than 0314 and less than 0476, so root branch 2 is taken for insertion. It is larger than 037E and less than 0410, so Bin 61 is chosen for insertion. Entry 61 is empty, so the insertion can occur there. If it is the new least entry, it gets tagged as such and the (optional) 6 bit ordering pointer gets set to point to the previous least entry. Similarly, searches for 038F follow the branches down for the same comparison reasons, and the entry 3 is a match. Notice once again that the entries in the bin are not sorted into physically ordered locations.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A memory device, comprising:

a main data memory for storing a plurality of entries in the memory device;

an address map and overflow data memory for storing an address map of the entries in the main data memory, the address map comprising an intended address location (IAL) and an actual physical location (APL) wherein the IAL indicates the external memory address of each entry and the APL indicates the actual memory locations for each entry within the memory device;

a controller for controlling the operation of the main data memory and the address map and overflow data memory using the IAL and APL in order to operate the memory device as one or more of a CAM and a RAM, the controller further comprising a comparator that compares each bit of an incoming piece of data with each bit of each entry of a bin in the memory device and search tree logic unit that sorts through the entries in the memory device to reduce the number of bit-by-bit comparisons performed by the comparator by selecting a bin of the memory device.

2. The device of claim 1, wherein the search tree logic unit further comprises a first compare and branch logic unit that compares the incoming piece of data to one or more memory bins to determine the bin in which a key is located, each bin comprising a plurality of memory locations wherein the bin has a least value and a most value indicating the range of entry values in the memory locations encompassed by the bin so that the first compare and branch logic unit compares the incoming piece of data to the least and most values for each bin simultaneously to generate a selected bin.

3. The device of claim 2, wherein the search tree logic unit further comprises a second compare and branch logic unit that compares the incoming piece of data to the entries in one or more sub-bins in the bin selected by the first branch and compare logic unit, each sub-bin comprising a plurality of memory locations wherein the sub-bin has a least value and a most value indicating the range of entry values in the memory locations encompassed by the sub-bin so that the second compare and branch logic unit compares the incoming piece of data to the least and most values for each sub-bin contained in the selected bin simultaneously to generate a selected sub-bin.

4. The device of claim 3, wherein the comparator compares each bit in the incoming piece of data with each bit in the entries contained in the selected sub-bin in order to determine if a match has occurred between the entries in the memory device and the incoming piece of data.

5. A memory device, comprising:

a main data memory for storing a plurality of entries in the memory device;

an address map and overflow data memory for storing an address map of the entries in the main data memory, the address map comprising an intended address location (IAL) and an actual physical location (APL) wherein the IAL indicates the external memory address of each entry and the APL indicates the actual memory locations for each entry within the memory device;

a controller for controlling the operation of the main data memory and the address map and overflow data memory using the IAL and APL in order to store and retrieve data from the memory device, the controller further comprising a comparator that compares each bit of an incoming piece of data with each bit of each entry in a bin of the memory device and search tree logic unit that sorts through the entries in the memory device to reduce the number of bit-by-bit comparisons performed by the comparator by selecting a bin of the memory device.

6. The device of claim 5, wherein the search tree logic unit further comprises a first compare and branch logic unit that compares the incoming piece of data to one or more memory bins to determine the bin in which a key is located, each bin comprising a plurality of memory locations wherein the bin has a least value and a most value indicating the range of entry values in the memory locations encompassed by the bin so that the first compare and branch logic unit compares the incoming piece of data to the least and most values for each bin simultaneously to generate a selected bin.

7. The device of claim 6, wherein the search tree logic unit further comprises a second compare and branch logic unit that compares the incoming piece of data to the entries in one or more sub-bins in the bin selected by the first branch and compare logic unit, each sub-bin comprising a plurality of memory locations wherein the sub-bin has a least value and a most value indicating the range of entry values in the memory locations encompassed by the sub-bin so that the second compare and branch logic unit compares the incoming piece of data to the least and most values for each sub-bin contained in the selected bin simultaneously to generate a selected sub-bin.

8. The device of claim 7, wherein the comparator compares each bit in the incoming piece of data with each bit in the entries contained in the selected sub-bin in order to determine if a match has occurred between the entries in the memory device and the incoming piece of data.

9. A memory device, comprising:

a main data memory for storing a plurality of entries in the memory device;

an address map and overflow data memory for storing an address map of the entries in the main data memory, the address map comprising an intended address location (IAL) and an actual physical location (APL) wherein the IAL indicates the external memory address of each entry and the APL indicates the actual memory locations for each entry within the memory device; and a controller for controlling the operation of the main data memory and the address map and overflow data memory using the IAL and APL in order to store and retrieve data from the memory device, the controller further comprising an organizer that organizes the memory into a plurality of bins wherein each bin comprises a plurality of sub-bins and each sub-bin comprises a plurality of entries in the memory device, the bins and sub-bins having a least value and a most value associated with it that indicate a minimum value and a maximum value contained in the bin or sub-bin;

the controller further comprising a search tree logic unit that compares an incoming piece of data to the plurality of bins based on the least and most values to identify a bin in which the incoming piece of data is located and that compares the incoming piece of data to the sub-bins within the identified bin to determine the sub-bin that contains an entry matching the incoming piece of data.

* * * * *